March 4, 1958  J. K. AYNESWORTH  2,825,611
TRAY FOR AUTOMOBILES AND OTHER SIMILAR VEHICLES
Filed April 18, 1957
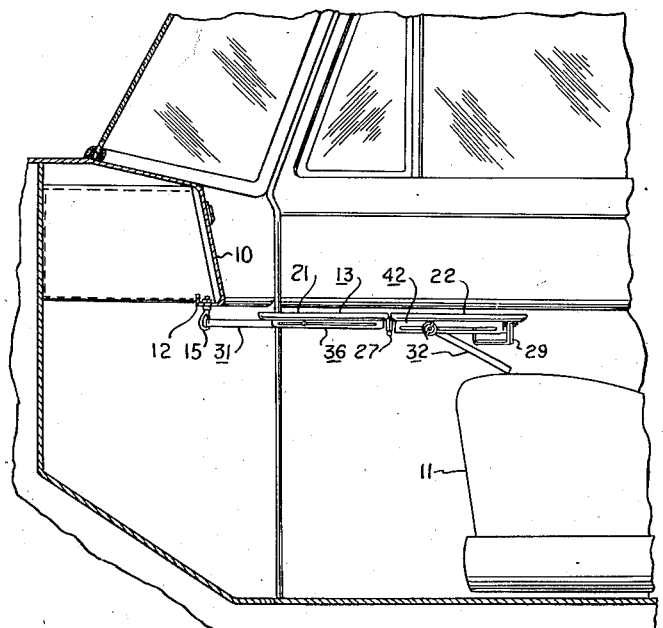
Fig. 1
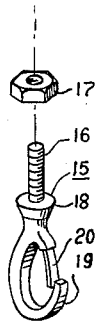
Fig. 4
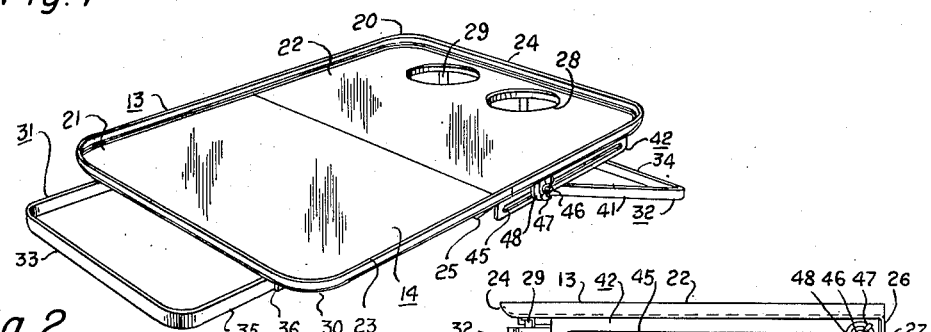
Fig. 2
Fig. 5
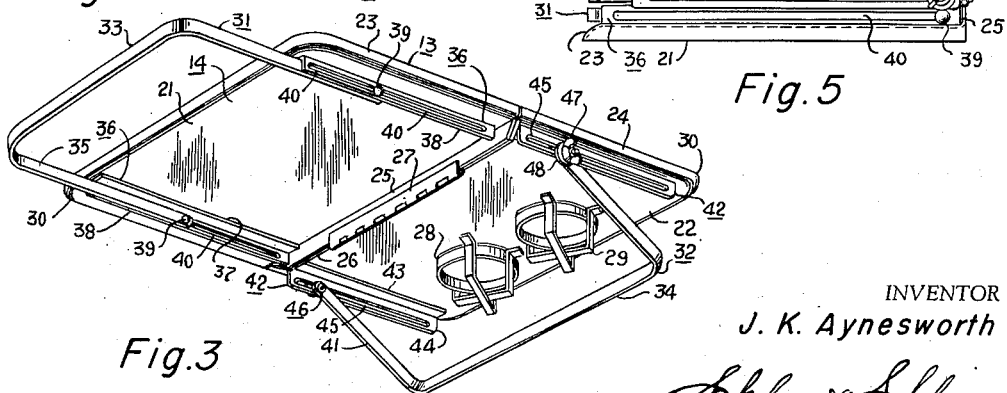
Fig. 3
INVENTOR
J. K. Aynesworth
BY Ehley & Ehley
ATTORNEYS

United States Patent Office

2,825,611
TRAY FOR AUTOMOBILES AND OTHER SIMILAR VEHICLES

J. K. Aynesworth, Dallas, Tex.

Application April 18, 1957, Serial No. 653,669

9 Claims. (Cl. 311—21)

This invention relates to new and useful improvements in trays for automobiles and other similar vehicles.

One object of the invention is to provide an improved tray for mounting between the instrument panel and adjacent seat of an automobile or other similar vehicle which is adapted to be detachably connected to the panel so as to be supported by the seat and panel and which is foldable so as to facilitate storage thereof upon detachment.

Another object of the invention is to provide an improved automobile tray having slidable means for adjustable connection to the instrument panel and pivotal means for resting on the automobile seat whereby the tray may be supported in a horizontal plane irrespective of the distance between the panel and seat or between the elevations thereof.

A further object of the invention is to provide an improved automobile tray, of the character described, having hinged sections to permit folding of the tray with supporting members being carried by the tray sections, one of the supporting members being slidably connected to its tray section and arranged to be removably attached to the instrument panel and the other member being pivotally and slidably connected to its tray section for resting on the seat, whereby the members coact to sustain the tray in a horizontal plane and permit adjustment thereof relative to said members and in accordance with the elevations of the panel and seat and the space therebetween.

A construction designed to carry out the invention will be hereinafter described, together with other features of the invention.

The invention will be more readily understood from a reading of the following specification and by reference to the accompanying drawing, wherein an example of the invention is shown, and wherein:

Fig. 1 is a longitudinal, vertical, sectional view of a portion of an automobile interior, showing a tray constructed and supported in accordance with the invention, Fig. 2 is a top perspective view of the tray, Fig. 3 is an underside perspective view of the tray, Fig. 4 is a perspective view of one of the spring clips for detachable connection with the tray, and Fig. 5 is a side elevational view of the tray folded for storage.

In the drawing, the numeral 10 designates the instrument panel of an automobile or similar vehicle having an adjacent passenger seat 11. Usually, the lower margin of the instrument panel 10 is reinforced by a forwardly-directed flange 12 and the seat 11 is adjustable forwardly and rearwardly. For supporting one end or margin of a tray 13 embodying the principles of the invention and having a substantially flat table top 14, a pair of spring clips or snap fasteners 15 are adapted to be attached to the flange snap 12 and, preferably, medially of the length thereof. Only one of the clips 15 is shown in Fig. 1 and its construction is more clearly illustrated in Fig. 4. Each clip includes an upstanding, screw-threaded shank 16 for receiving a nut 17 and adapted to extend through a suitable opening (not shown) drilled through the flange. An enlarged base or head 18 is provided for coacting with the nut 17 to clamp the flange therebetween and secure the clip thereto in a fixed, depending relationship. The clip has a substantially C-shaped hook 19 below its head 18 and a flat spring or flexible element 20 closes the opening of the hook in the usual manner. As shown in Fig. 1, the hook opening of each clip is directed rearwardly toward the seat 11 to facilitate connection of the tray.

As shown most clearly in Figs. 2 and 3, the table top 14 of the tray 13 includes a pair of complementary, rectangular sections 21 and 22 having continuous, upstanding flanges or rims 23 and 24 on three of their margins. Depending flanges 25 and 26 are coextensive with the remaining margins of the table sections 21 and 22 and are pivotally connected in contiguous, parallel relationship by an elongated hinge 27 to permit folding of one of said sections upon the other (Fig. 5). When the sections are unfolded, the flanges 25 and 26 abut each other to support said sections and their rims 23 and 24 in alinement (Fig. 3). One or more flanged openings 28, having depending supporting brackets 29, may be formed in one of the sections for receiving bottles or glasses (not shown). As shown by the numeral 30, the outer corners of the sections and their rims may be curved or rounded.

The table sections 21 and 22 are adapted to be supported by extensible members or brackets 31 and 32 which are substantially U-shaped and which preferably have substantially flat base or bight portions 33 and 34. A pair of parallel legs 35 extend inwardly from the ends of the bight portion 33 of the bracket 31 for engaging tracks 36 in the form of angle bars secured to the underside of the tray section 21 in parallel, spaced relationship and at a right angle to the depending flange 25. As shown in Fig. 3, each angle bar includes an inwardly-directed, horizontal flange 37 and an outer, depending flange 38. The bracket legs 35 engage between the depending flanges 38 and have their inner, free ends slidably connected thereto by suitable pins or rivets 39. A substantially coextensive slot or opening 40 extends longitudinally of each flange 38 to provide a guide for receiving the pins 39. It is noted that the tracks 36 extend longitudinally of the table top 14 and terminate inwardly of the outer end of its section 21 and that the legs 35 of the bracket 31 are of substantially the same length as said tracks to permit retraction of said bracket beneath said section upon folding of the tray. The bracket is adapted to be extended longitudinally of the table top for detachable connection of its bight portion 33 with the spring clips 15.

The bracket 32 is similar to the bracket 31 and has a pair of legs 41 extending inwardly from the end of its bight portion 34. A pair of similar tracks or angle bars 42 are secured to the underside of the tray section 22 and have similar horizontal and depending flanges 43 and 44. A guide opening or slot 45 extends longitudinally of each depending flange for receiving a screw 46 carried by the end of each bracket leg 41 whereby the bracket 32 is slidable inwardly and outwardly of the table section 22. For clamping the bracket legs in adjusted positions, a wing nut 47 is carried by each screw 46 and a washer 48 may be interposed between each nut and the flange 44. In addition to being slidable relative to the table top 14 and its section 22, the bracket is adapted to undergo relative pivotal movement for resting on the seat 11 to support the tray in a horizontal plane.

When not in use, the tray 13 is folded with its sections 21 and 22 in parallel, spaced relationship and the tracks 36 and 42 therebetween (Fig. 5). In order to permit this folding, the tracks 36 are disposed laterally inward of the tracks 42 and the depending flanges 25 and 26 are of sufficient width to accommodate the nested tracks and the superimposed brackets 31 and 32. Since the supporting brackets are retractable within the confines of the table sections, the folded tray is relatively compact and capable of being stored under the seat 11 or in another space of restricted area. The tray is erected by unfolding the same and engaging the bight portion 33 of the bracket 31 with the spring clips 15. By sliding this bracket outwardly of its tracks 36, said bracket is extended relative to the tray section 21 sufficiently to permit a portion of the section 22 to overlie the seat. The bracket 32 is slid outwardly of its tracks 42 and swung downwardly to engage its bight portion 34 with the seat. By tightening the wing nuts 47, this bracket is clamped in adjusted positions, such as at the angle shown in Fig. 1. Of course, the extension of the brackets and the inclination of the bracket 32 vary with the distance between the instrument panel 10 and seat 11 and the respective elevations of said panel and seat. These measurements differ from automobile to automobile and in accordance with the adjustment of the seat. Most seats are adjustable longitudinally and some vertically. The abutting engagement of the flanges 25 and 26 prevent downward or reverse folding of the tray and maintains the sections in alinement. Since the tracks 36 terminate inwardly of the outer end of the table section 21, the inner portions of the legs 35 remain engaged with said tracks to prevent relative tilting of the extended bracket 31.

The foregoing description of the invention is explanatory thereof and various changes in the size, shape and materials, as well as in the details of the illustrated construction may be made, without departing from the spirit of the invention.

What I claim and desire to secure by Letters Patent is:

1. A tray for mounting between the instrument panel and adjacent seat of an automobile including a table top, supporting means slidably connected to the table top for movement longitudinally thereof, means for detachably fastening the slidable supporting means to the instrument panel, and supporting means pivotally connected to said table top in opposed relation to said slidable supporting means for resting on the seat to sustain said table top in a horizontal plane in coaction with said slidable supporting means.

2. A tray as set forth in claim 1 wherein the table top includes a pair of sections with one of the supporting means being connected to each section, and hinge means connecting the sections between said supporting means whereby said table top is foldable to dispose its sections and supporting means in side by side relationship.

3. A tray as set forth in claim 1 wherein the pivoted supporting means has slidable connection with the table top so as to be movable longitudinally thereof.

4. A tray for mounting between the instrument panel and adjacent seat of an automobile including a table top, a pair of supporting members adjustably connected to the table top in opposed relationship, one of the supporting members being slidable relative to said table top for extension beyond the margin thereof, and means for detachably fastening the slidable member to the instrument panel, the other member being pivotal relative to said table top and being swingable downwardly for resting on the seat and coacting with said slidable member to support said top in a horizontal plane.

5. A tray as set forth in claim 4 wherein the pivoted supporting member is slidable relative to the table top for movement longitudinally thereof.

6. A tray as set forth in claim 4 wherein the table top is foldable and includes a pair of hinged sections, one of the supporting members being connected to each section.

7. A tray as set forth in claim 4 wherein the supporting members have connection with the underside of the table top, and track means on said underside for supporting the slidable member.

8. A foldable tray for mounting between the instrument panel and adjacent seat of an automobile including a pair of table sections, a hinge connecting the sections, a supporting bracket having legs for connection with each section, tracks on the underside of one of said sections for slidably supporting one of the brackets whereby said bracket is extensible beyond the margin of said section, a fastener on the underside of the instrument panel for removably attaching the slidable bracket thereto, and means for pivotally connecting the legs of the other bracket to the underside of the other section, said pivoted bracket being adapted to rest on the seat.

9. A foldable tray as set forth in claim 8 wherein the pivotal connecting means includes tracks for slidably supporting the legs of the pivotal bracket to permit adjustment of the pivotal connection between said legs and table section.

References Cited in the file of this patent

UNITED STATES PATENTS

| | | |
|---|---|---|
| 1,900,325 | Bayman | May 7, 1933 |
| 2,556,724 | Hubsch | June 12, 1951 |
| 2,771,331 | Messman | Nov. 20, 1956 |
| 2,771,332 | McGinley | Nov. 20, 1956 |
| 2,792,267 | Hubbard | May 14, 1957 |